(12) United States Patent
Onfroy et al.

(10) Patent No.: US 11,872,970 B2
(45) Date of Patent: Jan. 16, 2024

(54) AIRCRAFT BRAKING SYSTEM ARCHITECTURE

(71) Applicant: SAFRAN LANDING SYSTEMS, Velizy Villacoublay (FR)

(72) Inventors: Dominique Onfroy, Moissy-Cramayel (FR); Olivier Frey, Moissy-Cramayel (FR); Brian Goyez, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 694 days.

(21) Appl. No.: 16/587,665

(22) Filed: Sep. 30, 2019

(65) Prior Publication Data

US 2020/0101953 A1 Apr. 2, 2020

(30) Foreign Application Priority Data

Oct. 1, 2018 (FR) ...................................... 18 59059

(51) Int. Cl.
*B60T 8/17* (2006.01)
*B60T 8/175* (2006.01)
(Continued)

(52) U.S. Cl.
CPC ............ *B60T 8/1703* (2013.01); *B60T 8/175* (2013.01); *B60T 8/176* (2013.01); *B64C 25/46* (2013.01);
(Continued)

(58) Field of Classification Search
CPC ........ B60T 8/1703; B60T 8/175; B60T 8/176; B60T 2270/10; B60T 2270/20; B60T 2270/402; B60T 2270/403; B64C 25/46
See application file for complete search history.

(56) References Cited

U.S. PATENT DOCUMENTS 6,296,325 B1 * 10/2001 Corio .................... B60T 8/1703
318/362
2008/0258548 A1 * 10/2008 May .................... B60T 8/17616
303/139

(Continued)

FOREIGN PATENT DOCUMENTS

| EP | 2 878 501 A1 | 6/2015 |
| EP | 2 902 285 A1 | 8/2015 |
| EP | 3 275 743 A1 | 1/2018 |

OTHER PUBLICATIONS

French Search Report for 18 59059 dated May 22, 2019.

*Primary Examiner* — Faris S Almatrahi
*Assistant Examiner* — Andrew J Cromer
(74) *Attorney, Agent, or Firm* — Sughrue Mion, PLLC

(57) ABSTRACT

Aircraft braking system architecture comprising:
a brake comprising electromechanical actuators (1, 2);
a principal control channel (6) and an alternative control channel (7) comprising electrical components that are at least partly different and adapted to provide respectively a principal braking control function and an alternative braking control function that are at least partly different;
power modules (15, 16) comprising electrical components that are at least partly different and adapted to generate electrical power supply currents (I1, I2) on the basis of principal control signals or alternative control signals;
a surveillance unit (8) adapted to ensure that in normal operation the principal control signals are used and that in the event of a fault the alternative control signals are used to generate the electrical power supply currents.

18 Claims, 6 Drawing Sheets

(51) Int. Cl.
*B60T 8/176* (2006.01)
*B64C 25/46* (2006.01)

(52) U.S. Cl.
CPC ....... *B60T 2270/10* (2013.01); *B60T 2270/20* (2013.01); *B60T 2270/402* (2013.01); *B60T 2270/403* (2013.01)

(56) References Cited

U.S. PATENT DOCUMENTS

| | | |
|---|---|---|
| 2011/0155521 A1 | 6/2011 | Thibault et al. |
| 2012/0265417 A1* | 10/2012 | Vollert ................. B60T 13/745 60/533 |
| 2015/0217748 A1* | 8/2015 | Chico ................... B60T 17/221 701/3 |
| 2018/0022446 A1* | 1/2018 | Bonigen ................ B64C 25/34 701/3 |

* cited by examiner

AIRCRAFT BRAKING SYSTEM ARCHITECTURE

The invention concerns the field of aircraft braking system architectures.

BACKGROUND OF THE INVENTION

An aircraft electrical braking system architecture conventionally comprises a plurality of brakes each intended to brake one wheel of a landing gear of the aircraft.

Each brake comprises friction members and independent electromechanical actuators (typically four actuators) intended to apply a braking force to the friction members and thus to exert a braking torque on the wheel.

The architecture also comprises a control channel that receives a braking command from the pilot and transforms the braking command into control signals and a power module that generates from the control signals electrical power supply currents for supplying power to the electric motors of the electromechanical actuators.

An architecture of this kind naturally and intrinsically has a high level of redundancy by virtue of the number of independent electromechanical actuators used for braking.

This high level of redundancy is effective in countering the effects of the failure of one or more components of the architecture. However, this level of redundancy may be ineffective faced with a common mode fault resulting from the simultaneous failure of all the components of the same type, for example from the hardware failure of all the microcontrollers of the control channel or of the power module, or resulting from an error leading for example to an error by the software hosted by the microcontrollers under conditions not provided for at the development stage.

It may therefore prove necessary to implement two dissimilar control channels so that in the event of a common mode failure of a first control channel the second control channel remains functional and provides the braking.

An implementation in the form of an active/passive architecture may be envisaged. In an implementation of this kind the normally passive control channel is used only when a fault impacts the normally active control channel (i.e. a fault occurs in the channel itself or prevents it from operating).

An implementation in the form of an active/active architecture may also be envisaged. In an implementation of this kind the two control channels are active simultaneously and simultaneously provide the nominal operation of the electrical braking system.

Compared to the active/passive implementation, this implementation has the following advantages in particular:
  avoiding the introduction of inactive components into the normal operation of the electrical braking system (potentially having a negative impact in terms of reliability, weight and cost);
  avoiding the introduction of a reconfiguration mechanism (to go from the normally active control channel to the normally passive control channel) becoming a critical point of the system (failures thereof possibly leading to untimely losses of control or reconfigurations).

The hardware dissimilarity provides protection against a common mode failure of the hardware components resulting for example from premature aging and simultaneous failure of a batch of components because of a manufacturing defect. However, it does not provide protection against potential errors leading to a fault that may result from specific operating conditions not anticipated at the development stage and affecting for example the control logics.

OBJECT OF THE INVENTION

An object of the invention is an aircraft braking system architecture that makes it possible to solve all of the problems that have just been referred to.

SUMMARY OF THE INVENTION

To achieve that object, there is proposed an aircraft braking system architecture comprising:
  a brake intended to brake a wheel of the aircraft and comprising friction members and a first electromechanical actuator and a second electromechanical actuator respectively comprising a first electric motor and a second electric motor and adapted to apply a braking force to the friction members;
  a principal control channel and an alternative control channel comprising electrical components that are at least partly different and respectively adapted to produce a principal braking control function and an alternative braking control function that are at least partly different so that the principal control channel and the alternative control channel respectively generate principal control signals and alternative control signals;
  a first power module and a second power module comprising electrical components that are at least partly different and adapted to generate on the basis of the principal control signals or the alternative control signals respectively at least one first electrical power supply current for supplying power to the first electric motor and at least one second electrical power supply current for supplying power to the second electric motor;
  a surveillance unit adapted to ensure that in normal operation the principal control signals are used to generate the first electrical power supply current and the second electrical power supply current and in the event of a fault impacting the principal control channel the alternative control signals are used to generate the first electrical power supply current and the second electrical power supply current.

The principal control channel and the alternative control channel, which implement complex functions liable to failures and errors, therefore have a hardware dissimilarity and a functional dissimilarity.

This therefore limits the potential sources of errors common to the principal control channel and the alternative control channel.

The first power module and the second power module, for which only a hardware failure has to be considered a common mode failure, have for their part a hardware dissimilarity.

The architecture is therefore protected against a common mode failure of the hardware components.

Managing reconfiguration between the principal control channel and the alternative control channel is simple and does not introduce any complexity or similarity liable to generate a common mode fault.

The active/passive implementation applies only to the principal control channel and the alternative control channel and not to the power modules and the electromechanical actuators, with the result that the drawbacks of this implementation, referred to above, are here limited.

Other features and advantages of the invention will emerge on reading the following description of particular nonlimiting embodiments of the invention.

BRIEF DESCRIPTION OF THE DRAWINGS

Reference will be made to the drawings, in which.

DETAILED DESCRIPTION OF THE INVENTION

Figure 1:
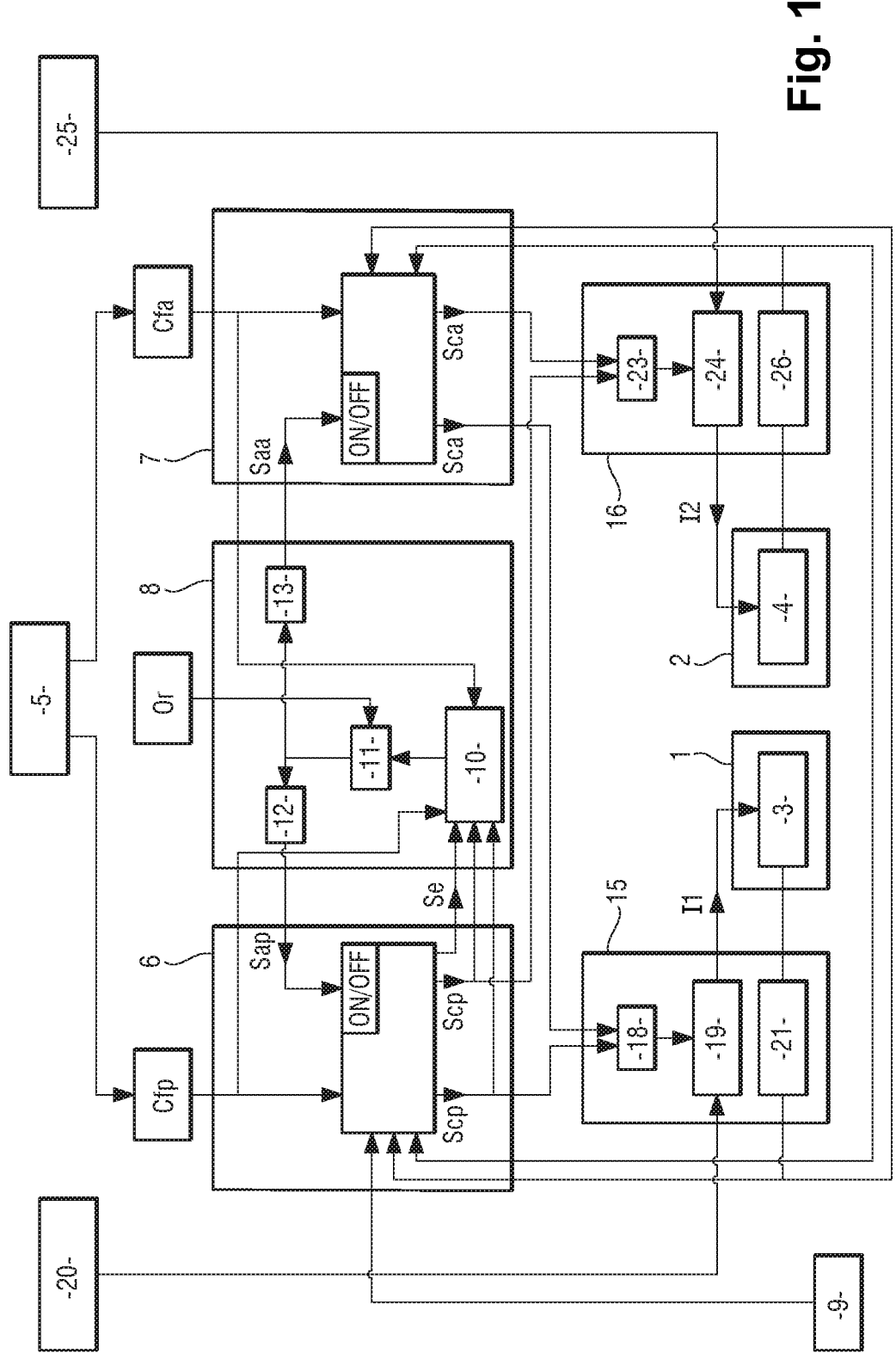
FIG. 1 represents an aircraft braking system architecture in accordance with a first embodiment of the invention with two electromechanical actuators.

Referring to FIG. 1, the braking system architecture in accordance with a first embodiment of the invention comprises a brake intended to brake a so-called "braked" wheel of a landing gear of the aircraft. The brake comprises friction members, for example a stack of carbon disks, and a first electromechanical actuator 1 and a second electromechanical actuator 2 that are adapted to apply a braking force to the friction members. The first electromechanical actuator 1 comprises a first electric motor 3 and the second electromechanical actuator 2 comprises a second electric motor 4.

The first electric motor 3 and the second electric motor 4 are controlled by a braking order generated for example by a pilot of the aircraft 5 or by an automatic braking system. The braking order is transformed into a principal braking command Cfp and an alternative braking command Cfa that represent the braking order and are generated via different mechanisms in order to prevent common mode faults between these two commands.

The braking system architecture further comprises a principal control channel 6, an alternative control channel 7 and a surveillance unit 8. Note here that each control channel 6, 7 and the surveillance unit 8 may be implemented in one or more equivalent units on one or more electrical circuit cards.

The principal control channel 6 comprises electrical components comprising one or more digital processing components that may include a microcontroller. The principal control channel 6 is designed in accordance with a first hardware specification (that is to say its design addresses hardware requirements defined by the first hardware specification) and a first functional specification (that is to say its design addresses functional requirements defined by the first functional specification).

The principal control channel 6 is firstly intended to provide a principal braking control function. The principal braking control function is produced by complex control logics that are executed by the microcontroller. The principal control channel 6 therefore acquires the principal braking command Cfp and generates principal control signals Scp sent to the first electromechanical actuator 1 and principal control signals Scp sent to the second electromechanical actuator (the principal control signals Scp may differ between the first electromechanical actuator 1 and the second electromechanical actuator 2). The principal braking command Cfp is a digital command and is routed over a digital bus. The principal control signals Scp are digital or analog PWM type Boolean signals.

Principal braking control function employs an anti-wheelspin function.

The principal braking control function also employs state machines to sequence different phases of operation of the first electromechanical actuator 1 and of the second electromechanical actuator 2.

The principal braking control function also employs servocontrol of the braking force based on a direct measurement of the braking force. Alternatively, servocontrol of the braking force is based on monitoring the depression of the pistons in the friction members of the brake.

The principal control channel 6 is moreover adapted to detect a fault that impacts it whether it originates in the principal control channel 6 itself or externally. Auto-surveillance and/or a watchdog type mechanism are employed for this purpose in the principal control channel 6. The principal control channel 6 therefore produces a state signal Se representing the state (fault or normal operation) of the principal control channel 6.

The principal control channel 6 is also connected to one or more sensors 9 that measure one or more parameters of the wheel, of the brake or of the electromechanical actuators. These sensors 9 are used to implement the principal braking control function.

The sensors 9 include for example a wheel rotation speed sensor that is used to implement an anti-wheelspin function. The alternative control channel 7 is not connected to a sensor of this kind because it does not provide this function.

However, the alternative control channel 7 could also implement the anti-wheelspin function. In this case a speed sensor is used that is different from that of the principal control channel 6. The alternative control channel 7 comprises electrical components dissimilar to the digital processing components of the principal control channel 6, in this instance a plurality of analog components. The electrical components of the alternative control channel 7 are therefore at least partly different from those of the principal control channel 6.

Note that the dissimilarity between the principal control channel 6 and the alternative control channel 7 may be greater than this and concern all the electronic components of the control channels.

Moreover, the case of an "all analog" alternative control channel 7 is a special case. The alternative control channel could include digital components dissimilar to those of the principal control channel 6, enabling simplified logics.

The alternative control channel 7 is firstly intended to implement an alternative braking control function that is at least partly different from the principal braking control function. The alternative control channel 7 is designed in accordance with a second hardware specification and a second functional specification that are different from those of the principal control channel 6. The alternative braking control function is provided by simplified control logics executed by the analog (or digital: see the previous paragraph) components. The simplified control logics produce braking in a degraded mode with performance and functionalities reduced compared to the principal control channel 6. The alternative control channel 7 therefore acquires the alternative braking command Cfa and generates alternative control signals Sca sent to the first electromechanical actuator 1 and alternative control signals Sca sent to the second electromechanical actuator 2 (the alternative control signals Sca may be different between the first electromechanical actuator 1 and the second electromechanical actuator 2).

The alternative braking command Cfa is an analog command. Alternatively, the alternative braking command Cfa could be a discrete command. The principal braking command Cfp and the alternative braking command Cfa respectively feed the principal control channel 6 and the alternative control channel 7 on distinct communication channels.

The alternative control signals Sca are digital or analog PWM type Boolean signals.

The alternative braking control function does not implement an anti-wheelspin function.

Here the alternative braking control function does not employ state machines.

The alternative braking control function implements a simplified form of servocontrol that is intended only to ensure that the braking force is bounded between a low level enabling minimum braking performance and a high level guaranteeing no locking up of the wheel. Alternatively, the simplified servocontrol may consist in servocontrol of first power supply electrical currents I1 supplied to the first electric motor 3 of the first electromechanical actuator 1 and second electrical power supply currents I2 supplied to the second electric motor 4 of the second electromechanical actuator 2. Here the electric motors are three-phase motors, which explains why it is specified that each electric motor is supplied with power by a plurality of currents. Different type motors (single-phase, DC, etc.) each supplied with power by a single current could also be used: there would then be a first power supply current and a second power supply current.

Servocontrol of the first electrical power supply currents I1 and the second electrical power supply currents I2 is based on a predetermined current command corresponding to the bounded braking force. Using a linear rather than binary command could also be envisaged.

It is possible for the relationship between the braking force and the electrical power supply currents I1 and I2 to be variable. In this case a plurality of values of the predetermined current command could be defined.

This is typically the case when the first electromechanical actuator 1 and the second electromechanical actuator 2 exhibit internal friction, resulting from the viscosity of their lubrication, which may be a function of the ambient temperature. In this case, the power supply currents are servocontrolled to two possible levels: a low level and a high level.

The low level is used for a low braking order, typically for a pedal command less than 50% or for a park contactor in an intermediate position. The low level makes it possible to achieve the predetermined critical force for a medium ambient temperature range. The high level is used for a high braking order, typically for a pedal command greater than 50% or for a park contactor in the high position. The high level makes it possible to achieve the predetermined critical force for a low ambient temperature range.

The surveillance unit 8 comprises for its part digital electrical components and/or analog electrical components. These electrical components are used to implement a surveillance module 10, an OR gate 11, a NOT gate 12 and a timer 13.

A first input of the OR gate 11 is connected to an output of the surveillance module 10. The input of the NOT gate 12 is connected to the output of the OR gate 11. The input of the timer 13 is connected to the output of the OR gate 11. The output of the NOT gate 12 is connected to the principal control channel 6. The output of the timer 13 is connected to the alternative control channel 7.

An activation signal Sap from the principal control channel 6 is present at the output of the NOT gate 12. The principal control channel 6 is activated when the activation signal Sap assumes the binary value "1". The principal control channel 6 is deactivated when the activation signal Sap assumes the binary value "0".

Similarly, an activation signal Saa from the alternative control channel 7 is present at the output of the timer 13. The alternative control channel 7 is activated when the activation signal Saa assumes the binary value "1". The alternative control channel 7 is deactivated when the activation signal Saa assumes the binary value "0".

The surveillance module 10 receives from the principal control channel 6 the principal control signals Scp sent to the first input of the first electromechanical actuator 1, the principal control signals Scp sent to the second input of the second electromechanical actuator 2 and receives the state signal Se at its third input. The surveillance module 10 also receives the principal braking command Cfp at its fourth input and the alternative braking command Cfa at its fifth input.

The surveillance unit 8 is also able to receive a reconfiguration order Or produced by the pilot or by the avionics. The reconfiguration order Or is applied to a second input of the OR gate 11.

The braking system architecture further comprises a first power module 15 and a second power module 16. The first power module 15 and the second power module 16 include electrical components that are at least partly different at the hardware level. Accordingly, the first power module 15 and the second power module 16 are designed in accordance with the same functional specification but in accordance with different hardware specifications.

Note that the first power module 15 and the second power module 16 may each be implemented in one or more equipment units on one or more electric circuit cards.

The first power module 15 firstly comprises an OR gate 18. The OR gate 18 comprises a first input connected to an output of the principal control channel and a second input connected to an output of the alternative control channel.

The first power module 15 also comprises an inverter 19 (and its drivers). The output of the OR gate 18 is connected to the input of the inverter 19. The inverter 19 receives a first DC power supply voltage from a principal power source 20 of the aircraft. The inverter 19 generates on the basis of the output signals of the OR gate 18, that is to say on the basis of the principal control signals Scp or the alternative control signals Sca, and on the basis of the first DC power supply voltage the first electrical power supply currents I1 for supplying power to the first electric motor 3 of the first electromechanical actuator 1.

The first power module 15 further comprises one or more sensors 21, in this instance a sensor of the position of a rotor of the first electric motor 3 and/or a current sensor that measures the first electrical power supply currents I1 and/or a force sensor. The measurements produced by the sensors 21 of the first power module 15 are acquired both by the principal control channel 6 and by the alternative control channel 7 and enable the principal control channel 6 to implement the principal braking control function and the alternative control channel 7 to implement the alternative braking control function.

Similarly, the second power module 16 comprises firstly an OR gate 23. The OR gate 23 comprises a first input connected to an output of the principal control channel 6 and a second input connected to an output of the alternative control channel 7. The OR gate 23 receives at its first input the principal control signals Scp and at its second input the alternative control signals Sca.

The second power module 16 also comprises an inverter 24 (and its drivers). The output of the OR gate 23 is connected to the input of the inverter 24. The inverter 24 receives a second DC power supply voltage from an alternative power source 25 of the aircraft. The principal power source 20 and the alternative power source 25 are in different power networks. The inverter 24 generates on the basis of the output signals of the OR gate 23, that is to say on the basis of the principal control signals Scp or the alternative control signals Sca, and on the basis of the second DC power supply voltage second electrical power supply currents I2 for supplying power to the second electric motor 4 of the second electromechanical actuator 2.

The second power module 16 further comprises one or more sensors 26, in this instance a sensor of the position of a rotor of the second electric motor 4 and/or a current sensor that measures the second power supply electrical currents I2 and/or a force sensor. The measurements produced by the sensors 26 of the second power module 16 are acquired both by the principal control channel 6 and by the alternative control channel 7 and enable the principal control channel 6 to produce the principal braking control function and the alternative control channel 7 to produce the alternative braking control function.

The operation of the braking system architecture is described in more detail next.

Figure 2:
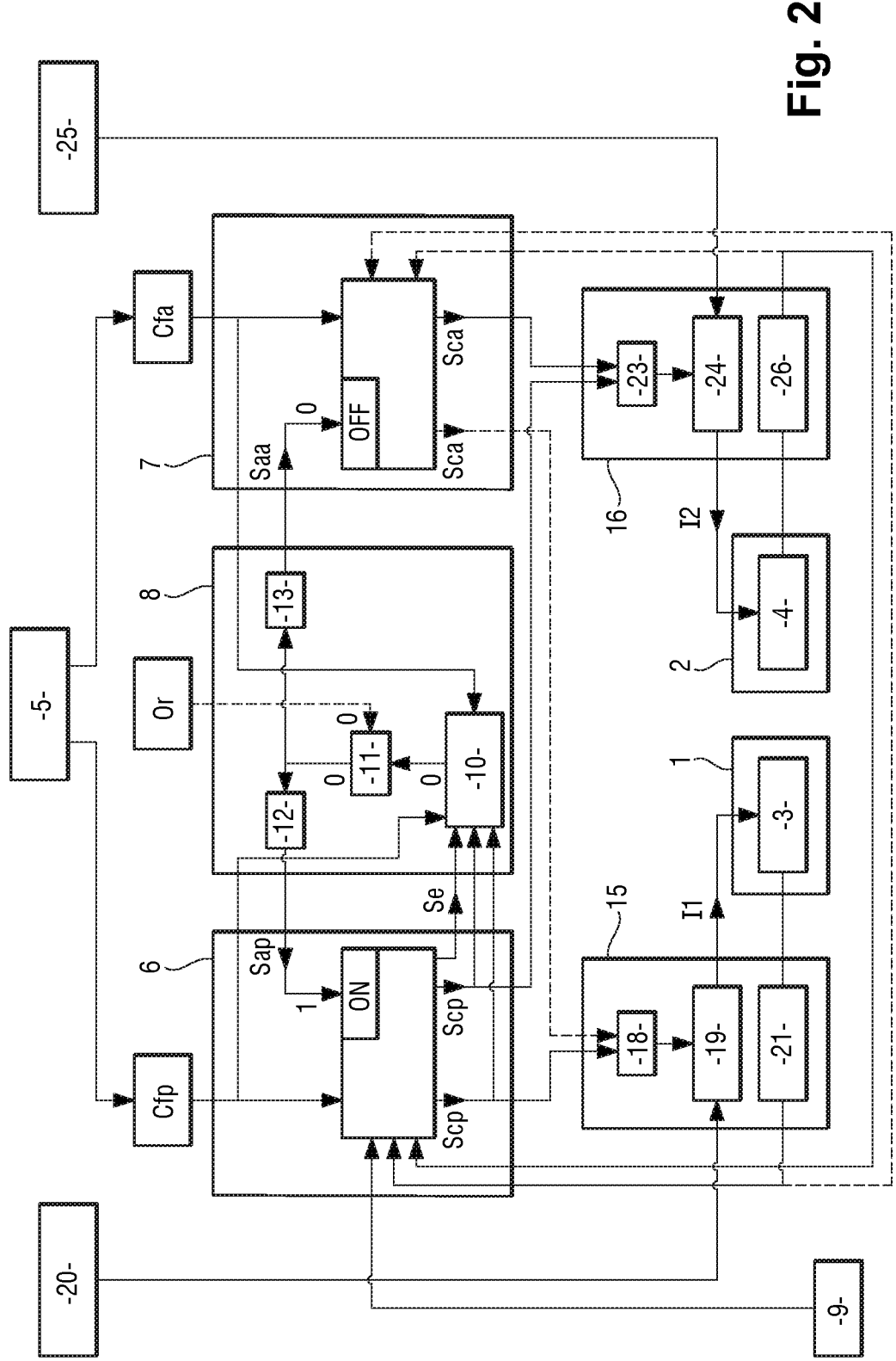
FIG. 2 represents the architecture from FIG. 1 in normal operation.

Referring to FIG. 2, in a normal mode of operation, which corresponds to a situation in which the principal control channel 6 operates normally, the alternative control channel 7 is deactivated. The communication channels shown in dashed line in FIG. 2 are inactive.

The surveillance module 10 of the surveillance unit 8 does not detect any fault. The output of the surveillance module 10 and therefore the first input of the OR gate 11 assume the value 0. No reconfiguration order Or is received and the second input of the OR gate 11 therefore has the value 0. The output of the OR gate 11 has the value 0 and the output of the NOT gate 12 therefore has the value 1, whereas the output of the timer 13 has the value 0. The activation signal Sap of the principal control channel 6 is equal to 1 with the result that the principal control channel 6 is activated. To the contrary, the activation signal Saa of the alternative control channel 7 is equal to 0 with the result that the alternative control channel 7 is deactivated.

Thus the principal control channel 6 produces the principal control signals Scp whereas the alternative control signals Sca of the alternative control channel 7 are in the inactive state.

Thus in normal operation the surveillance unit 8 is adapted to activate the principal control channel 6 and to deactivate the alternative control channel 7.

The principal control signals Scp are therefore present at the output of the OR gate 18 of the first power module 15, just as at the output of the OR gate 23 of the second power module 16. The principal control signals Scp control the inverter 19 of the first power module 15 and the inverter 24 of the second power module 16 and are therefore used to generate the first electrical power supply currents I1 and the second electrical power supply currents I2.

Figure 3:
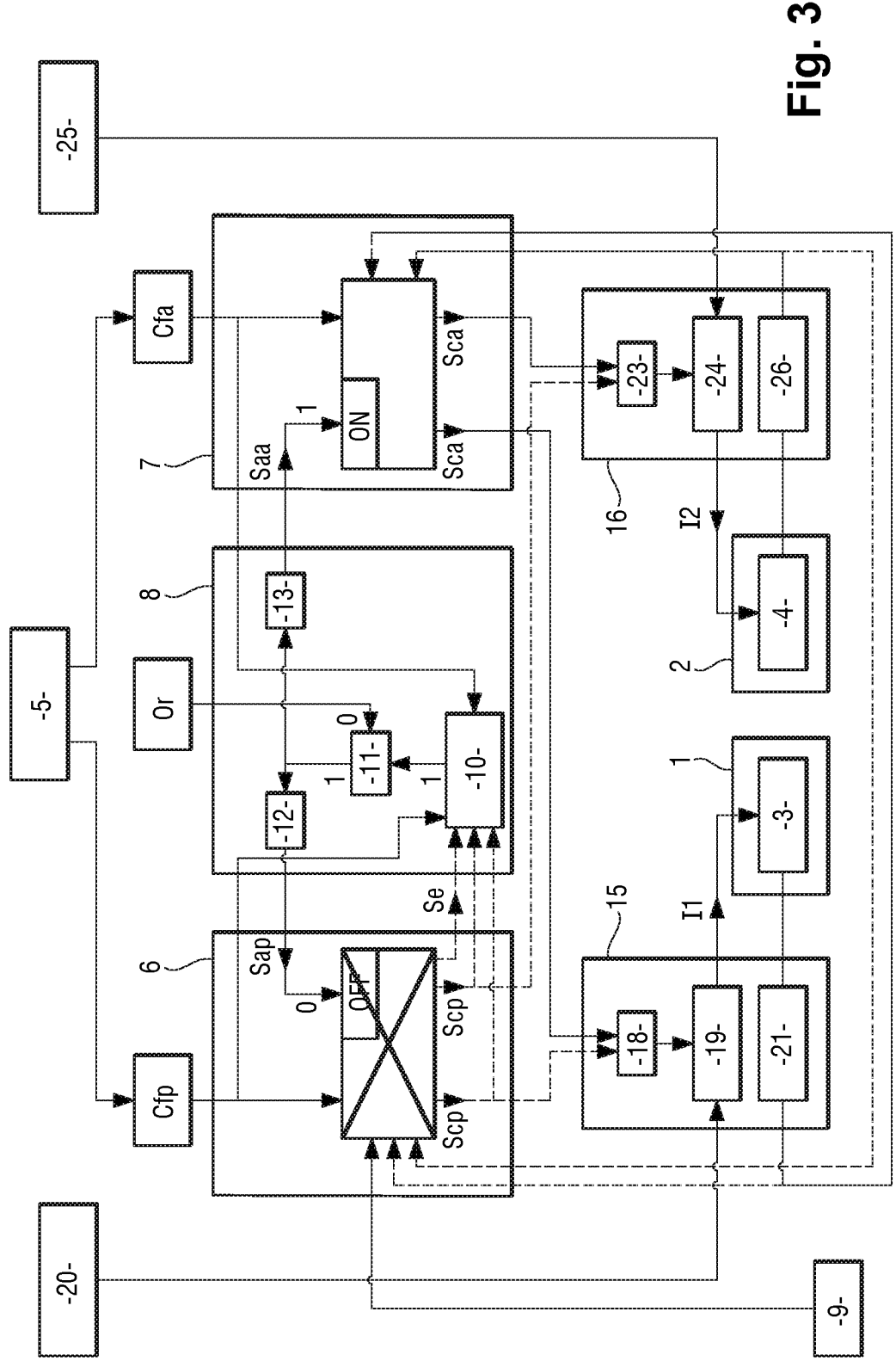
FIG. 3 represents the architecture from FIG. 1 when a fault impacts the principal control channel.

Referring to FIG. 3, it is possible for a fault to impact the principal control channel 6. That fault may originate either directly in the principal control channel 6 or externally of the principal control channel 6 but result in a malfunction of the principal control channel 6. For example the fault may occur upstream of the principal control channel 6 and result in defective transmission of the principal braking command Cfp, caused for example by a fault in the processing avionic layer or the digital bus.

In this case the surveillance module 10 is able to detect the fault itself. If the fault causes defective transmission of the principal braking command Cfp, the fault may be detected by the surveillance module 10 by comparing the principal braking command Cfp (which it receives at its fourth input) and the alternative braking command Cfa (which it receives at its fifth input).

The principal control channel 6 is also able to detect the fault itself and to transmit a fault message to the surveillance module 10 of the surveillance unit 8. According to this latter hypothesis, the state signal Se that the surveillance module 10 receives at its third input represents a fault.

The output of the surveillance module 10 and therefore the first input of the OR gate 11 assume the value 1. No reconfiguration order Or is received and the second input of the OR gate 11 therefore has the value 0. The output of the OR gate 11 has the value 1 and the output of the NOT gate 12 therefore has the value 0, whereas the output of the timer 13 has the value 1. The activation signal Sap of the principal control channel 6 therefore goes to 0 with the result that the principal control channel 6 is deactivated. To the contrary, the activation signal Saa of the alternative control channel 7 goes to 1 after a short delay produced by the timer 13 with the result that the alternative control channel 7 is activated.

The alternative control channel 7 therefore produces the alternative control signals Sca whereas the principal control signals Scp of the principal control channel 6 are in the inactive state. Note that the short delay makes it possible to prevent the principal control signals Scp (produced before the occurrence of the fault) and the alternative control signals Sca (produced starting from the occurrence of the fault) from being superposed.

The alternative control signals Sca are therefore present at the output of the OR gate 18 of the first power module 15, just as at the output of the OR gate 23 of the second power module 16. The alternative control signals Sca control the inverter 19 of the first power module 15 and the inverter 24 of the second power module 16 and are therefore used to generate the first electrical power supply currents I1 and the second electrical power supply currents I2.

The surveillance unit 8 is therefore adapted to deactivate the principal control channel 6 and to activate the alternative control channel 7 in the event of a fault impacting the principal control channel 6.

Thus the architecture is reconfigured, that is to say the active channel is changed, by the surveillance unit 8. However, this reconfiguration may also be carried out by the pilot if they detect abnormal behaviour of the system, in order to switch to control by the alternative control channel 7. Reconfiguration may also be activated automatically by the avionics. This reconfiguration uses the reconfiguration order Or applied to the second input of the OR gate 11. When the principal control channel 6 is active and the first input of the OR gate has the value 0 a reconfiguration order Or equal to 1 enables the activation signal Sap of the principal control channel 6 to go from 1 to 0 and the activation signal Saa of the alternative control channel 7 to go from 0 to 1: the principal control channel 6 is deactivated and the alternative control channel 7 is activated.

Figure 4:
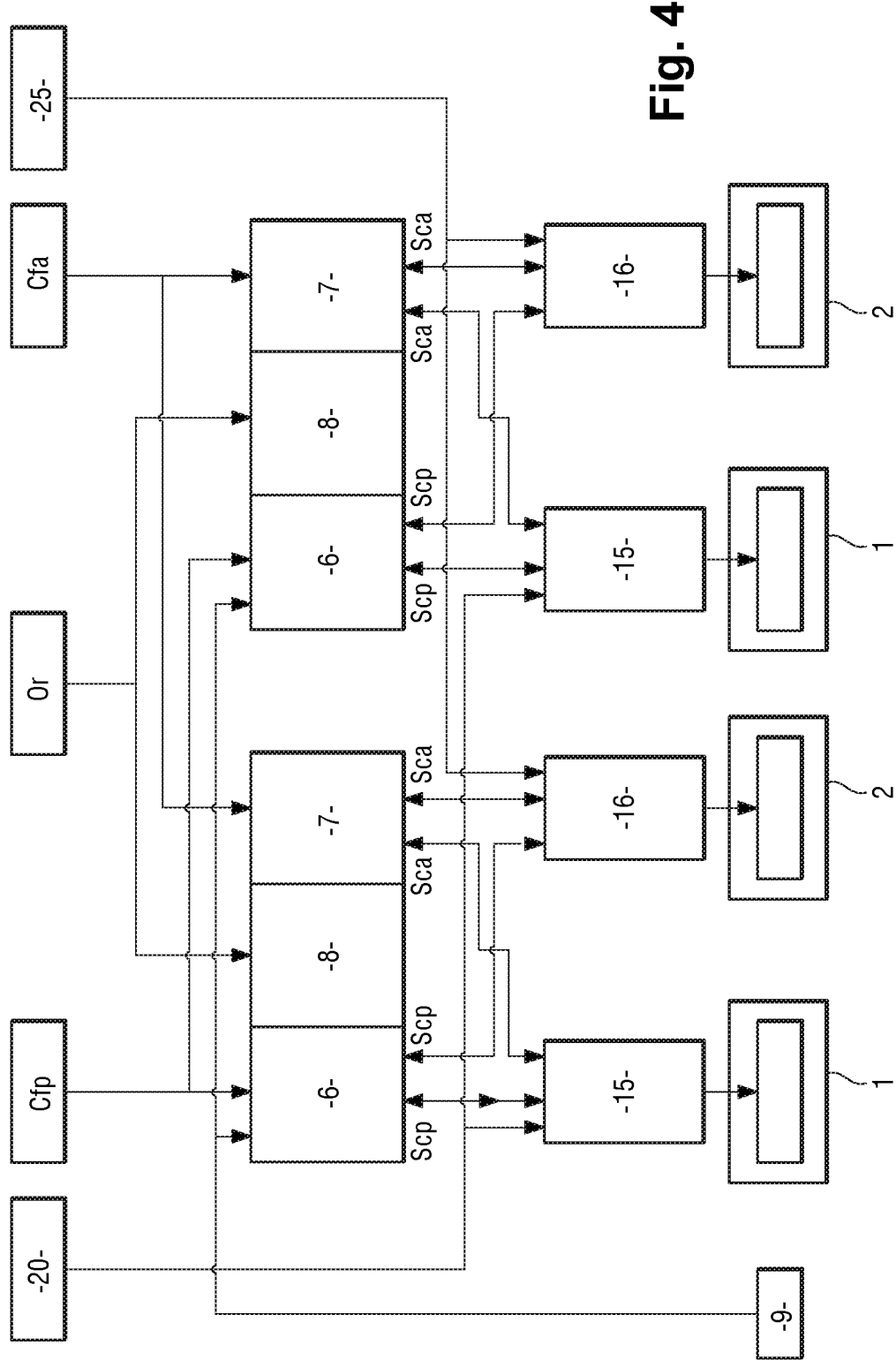
FIG. 4 represents an aircraft braking system architecture in accordance with the first embodiment of the invention with four electromechanical actuators.

Referring to FIG. 4, it is seen that a complete brake comprises four actuators that are controlled by two redundant principal control blocks 6 and by two redundant alternative control blocks 7. The principal control channel 6 is formed by the two principal control blocks 6 and the alternative control channel 7 is formed by the two alternative control blocks 7.

The principal control channel 6 generates principal control signals Scp sent to the two first power modules 15 and therefore to the two first electromechanical actuators 1 and sent to the two second power modules 16 and therefore to the two second electromechanical actuators 2.

Similarly, the alternative control channel 7 generates alternative control signals Sca sent to the two first power modules 15 and therefore to the two first electromechanical actuators 1 and sent to the two second power modules 16 and therefore to the two second electromechanical actuators 2.

The first power modules 15 and the second power modules 16 are designed in accordance with different hardware specifications.

The inverters of the first power modules 15 are supplied with power by the principal power source 20 and the inverters of the second power modules 16 are supplied with power by the alternative power source 25.

Note that loss of the principal power source 20 or of the alternative power source 25 leads to loss of braking by only half of the actuators (that is to say the first electromagnetic actuators 1 or the second electromagnetic actuators 2).

There are known principles for prevention or limiting of the impact of this type of fault by the principal channel to secure power networks or to compensate inactive actuators by means of the actuators that remain active are known.

Note also that a single or common mode failure affecting a single component (inverter, OR gate upstream of the inverter, sensors) might impact either all the first power modules or all the second power modules. A failure of this kind leads to loss of braking by one or all of the motors of the associated actuators.

The other actuators that remain active enable a reduced braking capacity to be maintained that is acceptable under operating conditions in degraded mode.

There are known principles for limiting of the impact of this type of fault the principal control channel to compensate inactive actuators by the actuators that remain active.

Note that depending on the technologies used some or all "single" components may be considered not to be susceptible to common mode faults and therefore implemented without dissimilarity.

Figure 5:
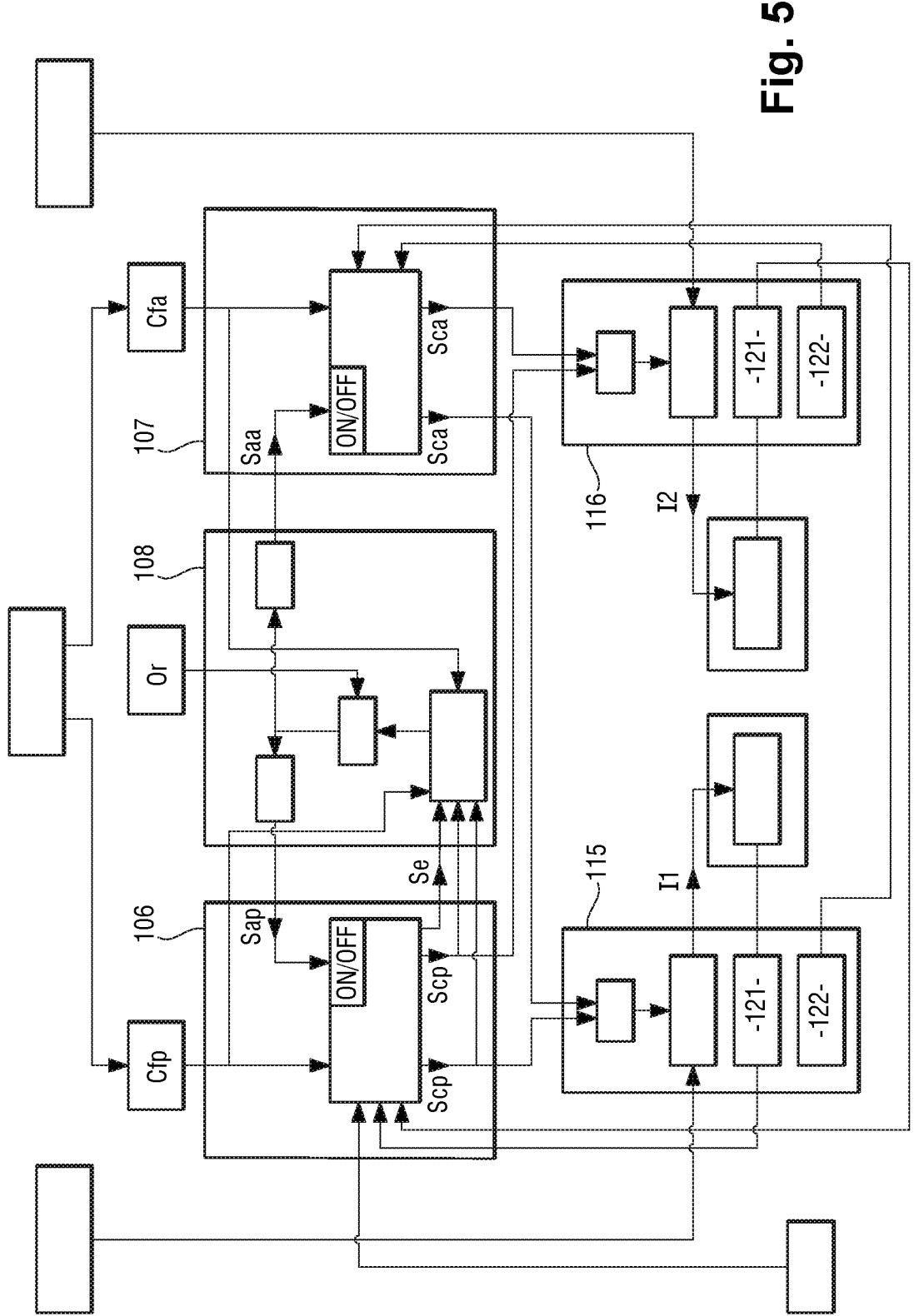
FIG. 5 represents an aircraft braking system architecture in accordance with a second embodiment of the invention with two electromechanical actuators.

Referring to FIG. 5, in a braking system architecture in accordance with a second embodiment of the invention the first power module 115 and the second power module 116 each include a principal sensor 121 and an alternative sensor 122. Here the alternative sensor 122 is a force threshold sensor adapted to close if the braking force reaches the predetermined critical force. The principal sensor 121 is one of those described in connection with the first embodiment of the invention (position sensor, current sensor or force sensor other than a contactor). The alternative sensor 122 and the principal sensor 121 are therefore different.

The principal sensor 121 is connected to the principal control channel 106 to provide the principal braking control function and the alternative sensor 122 is connected to the alternative control channel 107 to provide the alternative braking control function. The surveillance unit 108 is similar to that of the first embodiment of the invention.

This increases the dissimilarity between the principal control channel 106 and the alternative control channel 107.

The alternative braking control function is moreover simplified by using an alternative sensor 122 that is relatively simple.

Figure 6:
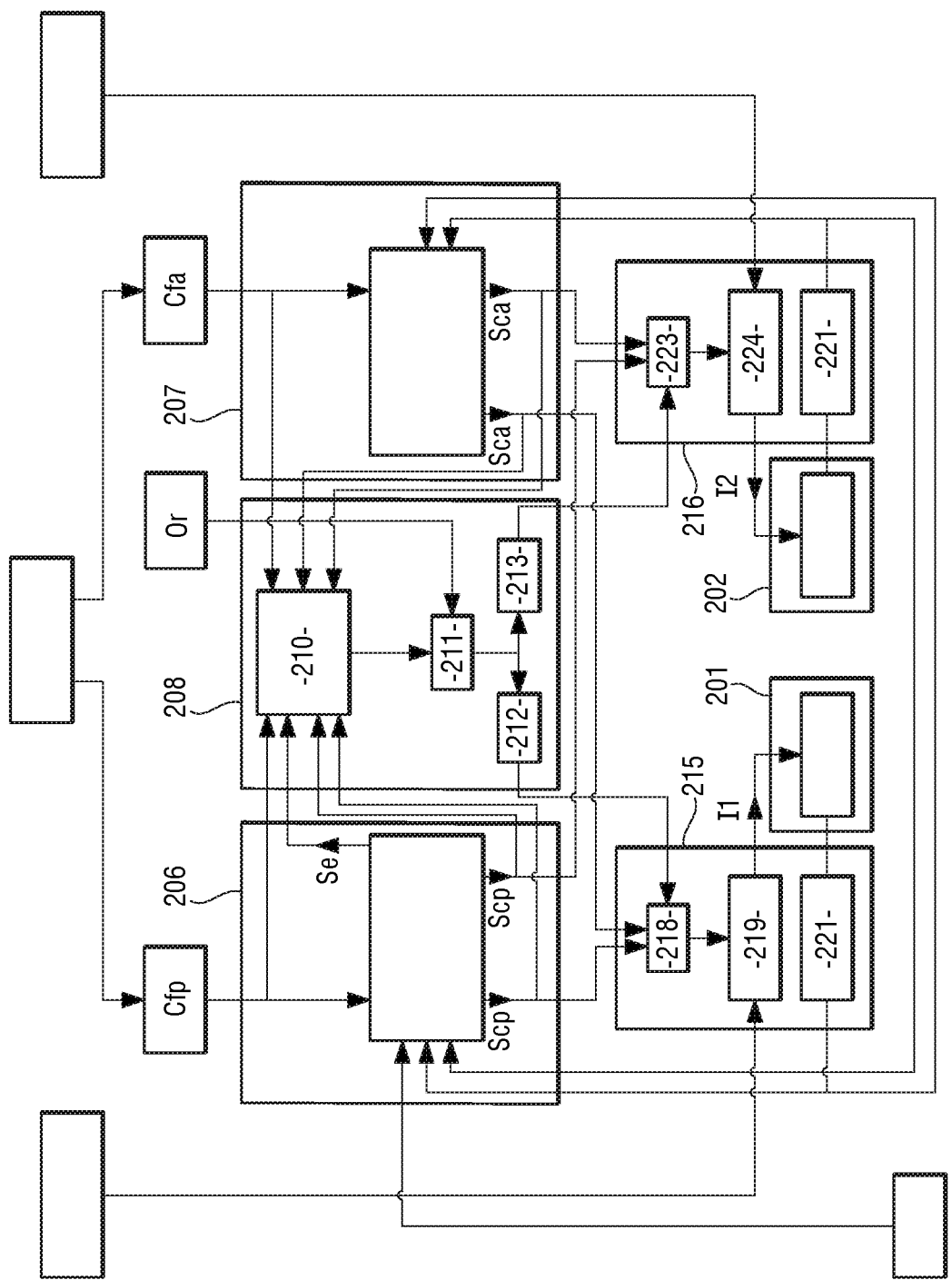
FIG. 6 represents an aircraft braking system architecture in accordance with a third embodiment of the invention with two electromechanical actuators.

A braking architecture in accordance with a third embodiment of the invention is described next with reference to FIG. 6.

The surveillance unit 208 again comprises a surveillance module 210, an OR gate 211, a NOT gate 212 and a timer 213.

The surveillance module 210 has a first input via which it receives the principal control signals Scp produced by the principal control channel 206 and sent to the first electromechanical actuator 201, a second input via which it receives the principal control signals Scp produced by the principal control channel 206 and sent to the second electromechanical actuator 202, a third input via which it receives the state signal Se produced by the principal control channel 106, a fourth input via which it receives the principal braking command Cfp, a fifth input via which it receives the alternative control signals Sca produced by the alternative control channel 207 and sent to the first electromechanical actuator 201, a sixth input via which it receives the alternative control signals Sca produced by the alternative control channel 207 and sent to the second electromechanical actuator 202, and a seventh input via which it receives the alternative braking command Cfa.

This time the output of the NOT gate 212 is connected to an input of the OR gate 218 of the first power module 215 and the output of the timer 213 is connected to an input of the OR gate 223 of the second power module 216. The OR gates 218, 223 of the first power module 215 and of the second power module 216, situated upstream of the inverters 219 and 224, are controllable as a function of logics produced by the surveillance module 210.

In the third embodiment of the invention the principal control channel 206 and the alternative control channel 207 are both active always and at the same time. The surveillance module 210 processes the signals that it acquires via its seven inputs and establishes a diagnosis of the principal control channel 206 and of the alternative control channel 207. As a function of the result of this diagnosis the surveillance module 210 selects from the principal control signals Scp and the alternative control signals Sca those which control the inverters 219, 224 of the first electromechanical actuator 201 and of the second electromechanical actuator 202 and which therefore generate the first electrical power supply currents I1 and the second electrical power supply currents I2. The selection is made by controlling the OR gates 218, 223 of the first power module 215 and of the second power module 216.

Here in normal operation the principal control signals Scp are selected by the surveillance unit 208. The alternative control signals Sca are selected if the surveillance module 210 detects a fault in the normal control channel 206.

The invention is not limited to the particular embodiments that have just been described but to the contrary covers any variant entering within the scope of the invention as defined by the claims.

It is of course possible for each control channel to be connected not to two electromechanical actuators but to a different number of electromechanical actuators via any number of power modules. Each control channel could also control actuators of a plurality of brakes.

The invention claimed is:

1. An aircraft braking system architecture comprising:
   a brake configured to brake a wheel of an aircraft and comprising friction members and a first electromechanical actuator and a second electromechanical actuator respectively comprising a first electric motor and a second electric motor and adapted to apply a braking force to the friction members;

a principal control channel and an alternative control channel comprising electrical components that are at least partly different and respectively adapted to produce a principal braking control function and an alternative braking control function that are at least partly different so that the principal control channel and the alternative control channel respectively generate principal control signals and alternative control signals, the principal braking control function employing servocontrol of the braking force based on direct measurement of the braking force or based on monitoring a depression of pistons of the first electromechanical actuator and of the second electromechanical actuator and the alternative braking control function employing a simplified servocontrol function that is intended only to ensure that the braking force is bounded between a low level enabling minimum braking performance and a high level guaranteeing absence of locking up of the wheel;

a first power module and a second power module comprising electrical components that are at least partly different and adapted to generate, based on the principal control signals or the alternative control signals respectively, at least one first electrical power supply current for supplying power to the first electric motor and at least one second electrical power supply current for supplying power to the second electric motor;

a surveillance unit adapted to ensure that in normal operation the principal control signals are used to generate the at least one first electrical power supply current and the at least one second electrical power supply current and, in an event of a fault impacting the principal control channel, the alternative control signals are used to generate the at least one first electrical power supply current and the at least one second electrical power supply current.

2. The aircraft braking system architecture according to claim 1, in which the surveillance unit is adapted to activate the principal control channel and to deactivate the alternative control channel in the normal operation and to deactivate the principal control channel and to activate the alternative control channel in the event of the fault impacting the principal control channel.

3. The aircraft braking system architecture according to claim 1, in which the principal control channel and the alternative control channel are activated permanently and, in which the surveillance unit is adapted to select the principal control signals to generate the at least one first electrical power supply current and the at least one second electrical power supply current in the normal operation and the alternative control signals to generate the at least one first electrical power supply current and the at least one second electrical power supply current in the event of the fault impacting the principal control channel.

4. The aircraft braking system architecture according to claim 1, in which the surveillance unit and the principal control channel are each adapted to detect the fault impacting the principal control channel.

5. The aircraft braking system architecture according to claim 1, in which the surveillance unit comprises a surveillance module, an OR gate, a NOT gate and a timer.

6. The aircraft braking system architecture according to claim 1, in which the principal control channel comprises at least one digital processing component adapted to produce the principal braking control function and in which the alternative control channel comprises analog components adapted to produce the alternative braking control function.

7. The aircraft braking system architecture according to claim 1, in which the principal control channel and the alternative control channel respectively receive a principal braking command and an alternative braking command that represent a braking order produced by a pilot of the aircraft or by an automatic braking system and that are routed to the principal control channel and to the alternative control channel by distinct communication channels.

8. The aircraft braking system architecture according to claim 1, in which the first power module and the second power module are supplied with the power by distinct power sources belonging to different power networks.

9. The aircraft braking system architecture according to claim 1, in which, in contrast to the alternative braking control function, the principal braking control function employs an anti-wheelspin function and state machines for sequencing different phases of operation of the first electromechanical actuator and of the second electromechanical actuator.

10. The aircraft braking system architecture according to claim 1, in which the simplified servocontrol function is a servocontrol function in respect of a predetermined current command corresponding to a predetermined critical force, the at least one first electrical power supply current and the at least one second electrical power supply current.

11. The aircraft braking system architecture according to claim 1, in which the first power module and the second power module each include a principal sensor and an alternative sensor different from the principal sensor, the principal sensor being connected to the principal control channel to produce the principal braking control function and the alternative sensor being connected to the alternative control channel to produce the alternative braking control function.

12. The aircraft braking system architecture according to claim 11, in which the principal sensor is a current sensor or a rotor position sensor or a force sensor and in which the alternative sensor is a force threshold sensor.

13. The aircraft braking system architecture according to claim 1, in which the first power module and the second power module each include an OR gate having a first input connected to the principal control channel and a second input connected to the alternative control channel.

14. An aircraft braking system comprising:

a brake configured to brake a wheel of an aircraft, the brake comprising friction members, a first electromechanical actuator, and a second electromechanical actuator, the first electromechanical actuator and the second electromechanical actuator respectively comprising a first electric motor and a second electric motor and configured to apply a braking force to the friction members;

principal control electrical circuitry configured to receive a principle baking command, to detect a fault, to output a state signal indicating a state of the principal control electrical circuitry, and to generate a principle braking control signal for servocontrol of the braking force based on a direct measurement of the braking force, or based on monitoring the first electromechanical actuator and the second electromechanical actuator;

alternative control electric circuitry that is at least partially different from the principal control electrical circuitry and is configured to generate an alternative braking control signal for a simplified servocontrol to only ensure that the braking force is between a low level that enables a minimum braking performance and a high level that guarantees the wheel does not lock up;

first power circuitry configured to generate, based on the principle braking control signal, at least one first electrical power supply current for supplying power to the first electric motor and at least one second electrical power supply current for supplying power to the second electric motor;

second power circuitry that is at least partly different from the first power circuitry and configured to generate, based on the alternative braking control signal, the at least one first electrical power supply current and the at least one second electrical power supply current; and surveillance electrical circuitry configured to receive the state signal, the principle braking control signal, and the alternative braking control signal and configured to, in a normal operation, output the principle braking control signal to the first power circuitry to generate the at least one first electrical power supply current and the at least one second electrical power supply current to perform the servocontrol and, in an event of the fault indicated by the state signal, output the alternative braking control signal to the second power circuitry to generate the at least one first electrical power supply current and the at least one second electrical power supply current to perform the simplified servocontrol.

15. The aircraft braking system according to claim 14, wherein the principal control electrical circuitry comprises one or more digital processing components, and the alternative control electric circuitry comprises a plurality of analog components.

16. The aircraft braking system according to claim 14, wherein the principal control electrical circuitry comprises one or more digital processing components, and the alternative control electric circuitry comprises a plurality of digital processing components configured to implement the simplified servocontrol.

17. The aircraft braking system according to claim 14, wherein the principal control electrical circuitry comprises a microcontroller, and the alternative control electric circuitry comprises a plurality of analog components.

18. The aircraft braking system according to claim 14, wherein the principal control electrical circuitry comprises a microcontroller, and the alternative control electric circuitry comprises a plurality of digital processing components configured to implement the simplified servocontrol.

* * * * *